March 13, 1928.

K. VON KANDO 1,662,549

METHOD OF SPEED REGULATION FOR POLYPHASE INDUCTION MOTORS

Filed Feb. 28, 1922

Inventor:
Kalman von Kando,
by Emery Booth Janney & Varney
Attys.

March 13, 1928.  1,662,549

K. VON KANDO

METHOD OF SPEED REGULATION FOR POLYPHASE INDUCTION MOTORS

Filed Feb. 28, 1922   3 Sheets-Sheet 3

Inventor:
Kalman von Kando,
by Emery Booth Janney & Varney
Att'ys.

Patented Mar. 13, 1928.

1,662,549

UNITED STATES PATENT OFFICE.

KALMAN von KANDO, OF BUDAPEST, HUNGARY, ASSIGNOR TO WESTINGHOUSE ELECTRIC & MANUFACTURING COMPANY, A CORPORATION OF PENNSYLVANIA.

METHOD OF SPEED REGULATION FOR POLYPHASE INDUCTION MOTORS.

Application filed February 28, 1922, Serial No. 540,034, and in Hungary March 2, 1921.

My invention relates to a speed regulation for polyphase induction motors by means of changing the pole connections and employing all the coils of the winding in each arrangement.

For the performance of the new speed regulation I use an $n.8$-pole threephase winding ($n$ being any suitable integer) having in each phase for each pole one coil, each coil overlapping two coils of each of the two other phases. Such three-phase windings are termed "three-range" windings in distinction of the "two-range" windings having one coil for each pair of poles. The invention is applicable to windings made up of single or multiple spiral or lap coils.

According to my invention the change of the pole number is effected by changing the winding in such manner, that the coils spaced apart by $\frac{120°}{n}$ are connected together at one end whilst two of the resulting coil-groups consisting each of $n.3$ coils and spaced apart by $\frac{60°}{n}$ with respect to each other are connected to the two terminals of each phase of a four-phase current source, forming thereby an eight-phase winding with $n.6$ poles.

It has been already proposed to transform an $n.8$ pole two-range three phase winding with one coil per pair of poles into an $n.6$ pole two-phase winding for the purpose of changing the speed of induction motors in a ratio of 3:4, but this method allows only this one relation, whilst the method according to my invention having for its base a doubled three-range $n.8$ pole three-phase winding allows the attainment of other speed relations beside the 3:4 ratio.

In the drawings:—

Figure 1:
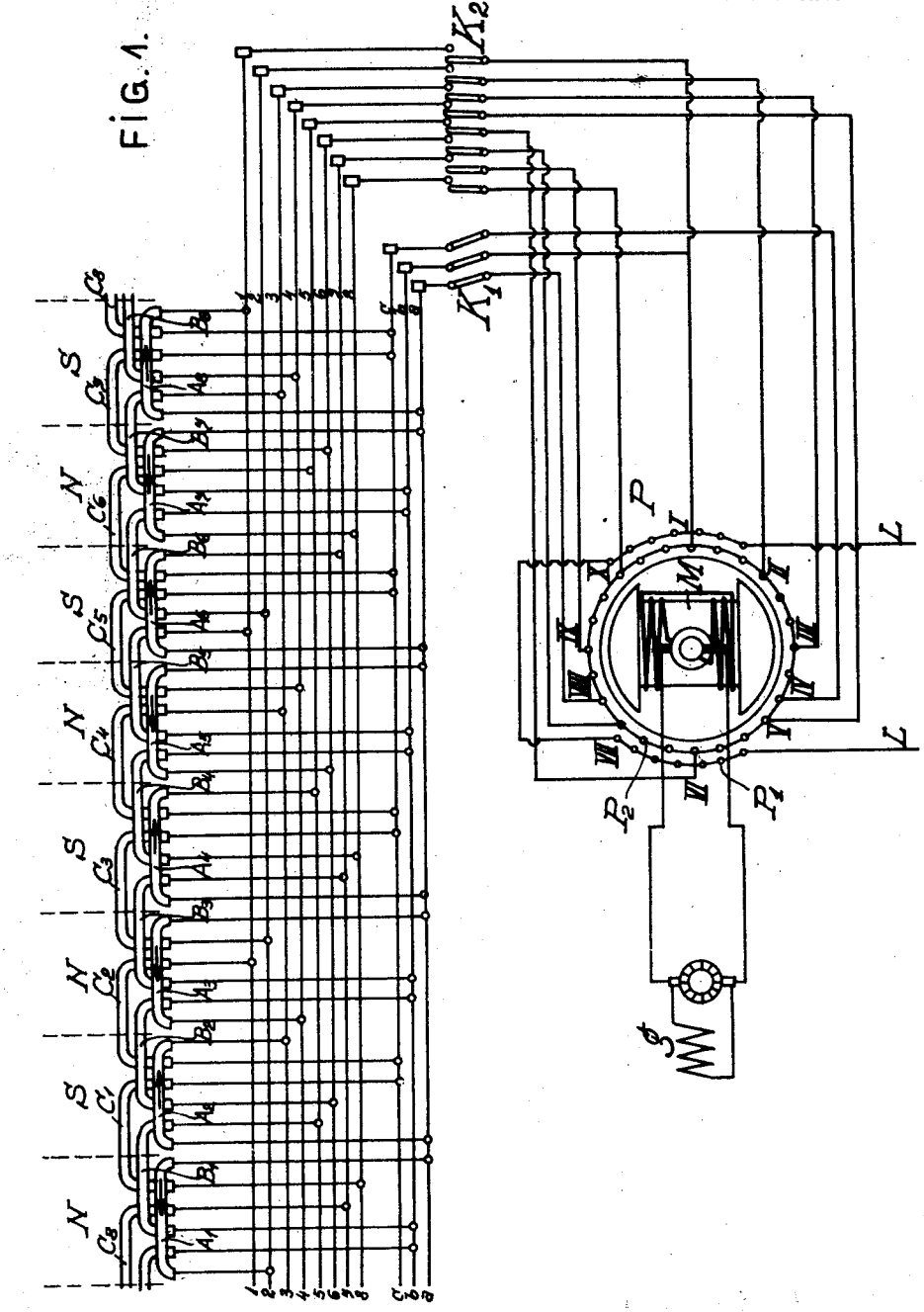
Fig. 1 shows diagrammatically an 8-pole three-phase primary winding as applied to the rotor of an induction motor.

The changing of pole connections is performed in the primary part of the motor. In Fig. 1 the stator winding is not shown, but is similar to the primary or rotor winding, with the difference however that the terminals of the coils are connected to a rheostat instead of being connected to the current source. As the primary winding is applied according to Fig. 1 to a rotor, the connections with the current source are established by means of slip-rings and brushes. Of course the changing of pole-connections according to my invention can be performed also if the primary winding is on the stationary part of the motor, in which case the terminals are simple leads. According to Fig. 1 the motor is fed by means of a phase-converter, but can be fed of course from the secondary part of another induction motor connected in cascade with the first one and provided with the change of poles according to my invention.

Referring to the drawings I have shown a phase-converter P comprising a stationary iron body provided with a continuous secondary winding $P_2$ from which the three-phase terminals I, IV, VIII are branched off at spacing of 120°, and further from which the so-called eight-phase terminals I, II, III, V, VI, VII, IX and X are branched off at spacing of 45°. The primary winding $P_1$ is connected to a single-phase current source L, L, and a rotary field magnet M within the stator is energized by a direct current generator $g$.

The coils belonging to the three different phases of the primary winding of the motor are lettered $A_1$—$A_8$, $B_1$—$B_8$ and $C_1$—$C_8$ respectively.

As will be seen from Fig. 1, the three-phase winding has per pole one coil overlapping two coils of each of the two other phases. The three coils $A_3$, $B_5$ and $C_2$ which are spaced 120° apart are connected together at one end by the slip-ring 1. Similarly the three coils $A_1$, $B_6$, $C_4$ also spaced 120° apart are connected together by the slip-ring 2. The other groups of three coils spaced apart by 120° are also connected respectively by the remaining slip-rings 3, 4, 5, 6, 7 and 8. Thus the three coils of each group spaced 120° apart are connected together at one end by one or other of the slip-rings 1–8, the other ends of these coils being connected to the slip-rings $a$, $b$ and $c$.

Figure 3:
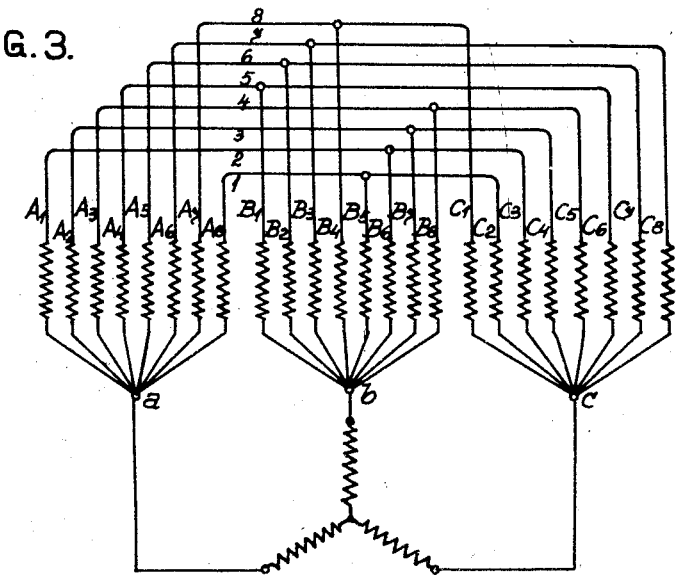
Fig. 3 shows diagrammatically the connections of the coils in the 8-pole three-phase arrangement.

In the 8-pole three-phase connection shown in Figs. 1 and 3, the three-phase current is fed from the terminals I, IV and VIII of the phase-converter P by means of the switch $k_1$, whilst the contacts of the switch $k_2$ are interrupted. The direction of the current at a given moment is indicated in Fig. 1 in the coils of phase A by arrows, a pole being generated in the axis of each coil, thus forming 8 poles in all.

As to be seen in Fig. 3, the one end of all the coils belonging to the same phase of the three-phase winding are connected to a common phase lead $a$, $b$, $c$ respectively, whilst the other ends of one coil of each phase spaced 120° apart are united by means of leads 1–8 respectively forming neutral points.

Figure 2:
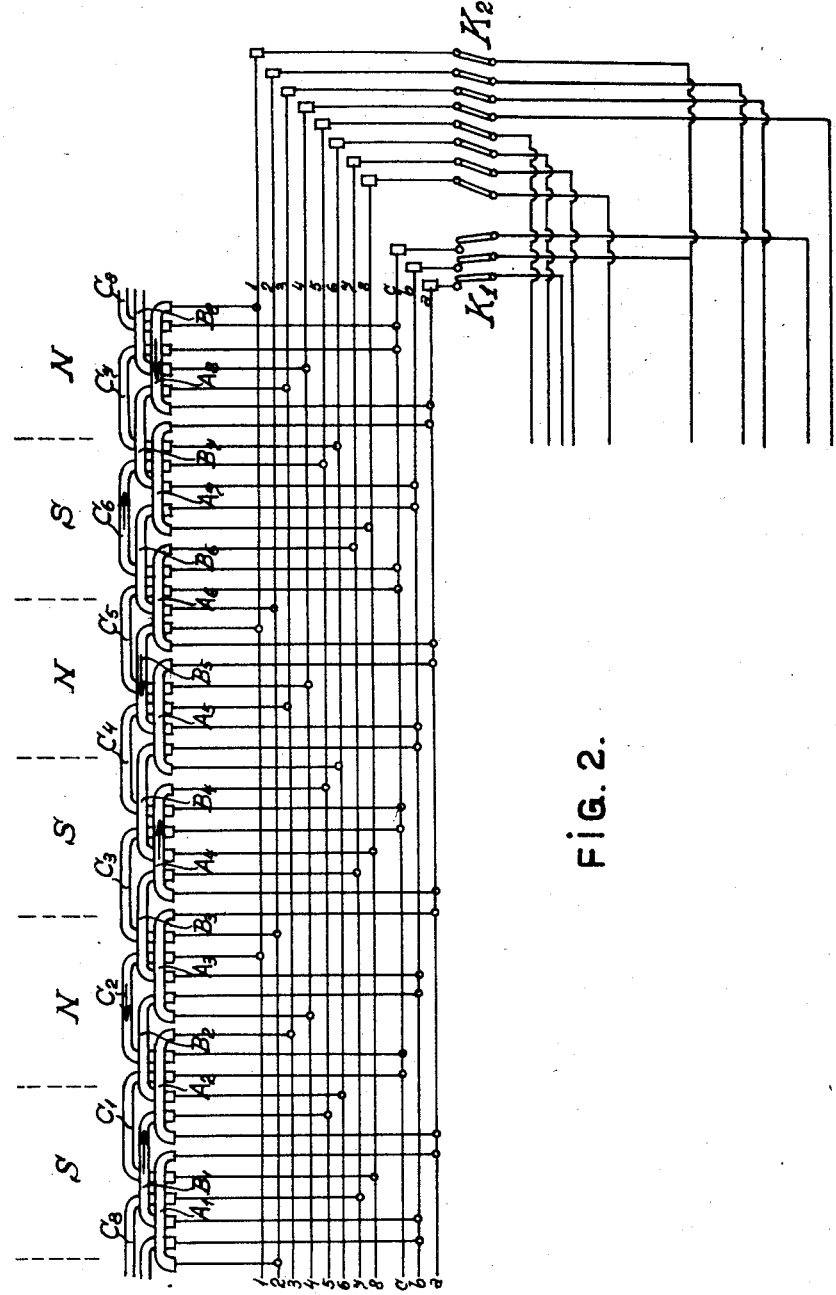
Fig. 2 shows the winding according to Fig. 1 connected for 6-pole eight-phase operation.
Figure 4:
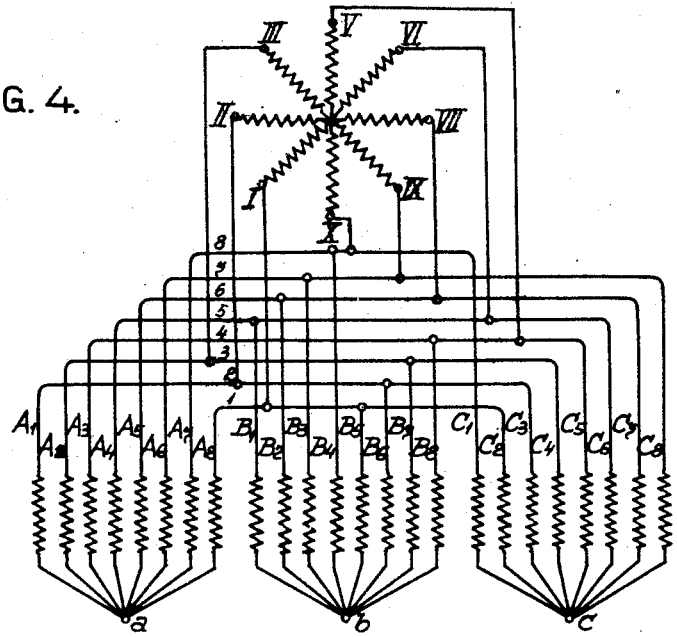
Fig. 4 shows diagrammatically the connections of the coils in the 6-pole eight-phase arrangement.

To change the connections to six poles, switch $k_1$ is interrupted (Fig. 2), and the leads or slip rings 1–8 are connected by means of the switch $k_2$ to the four-phase terminals I, II, III, V, VI, VII, IX and X of the phase-converter P respectively, whilst the slip rings $a$, $b$, $c$ form the neutral points, as is clearly seen from the diagram of connections shown in Figure 4.

The one group $A_8$, $B_5$, $C_2$ shown with full lines is connected to the one terminal I of the phase I—VI. The second terminal VI of the same phase is connected by means of the slip ring 5 to the group of coils $A_4$, $B_1$, $C_6$ and are disposed 60° away from the corresponding coils of the first group. The direction of the currents at a given moment in the coils of this phase as well as the poles generated by these currents are indicated by arrows in Fig. 2. It is to be seen, that a regular 6-pole field results.

In the same manner the two groups of coils $A_1$, $B_6$, $C_3$ and $A_5$, $B_2$, $C_7$ are connected together at one end by means of the rings 2 and 6 respectively to the phase II—VII; the coils $A_2$, $B_7$, $C_4$ and $A_6$, $B_3$, $C_8$ are connected by means of the rings 3 and 7 respectively to the phase III—VIII and the coils $A_3$, $B_8$, $C_5$ and $A_7$, $B_4$, $C_1$ are connected by means of the rings 4 and 8 respectively to the phase V—X.

Each of the four phases contains one-fourth of the total number of coils, conditions being similar in each phase except for a phase displacement of 45° corresponding to the four-phase rotary-field.

In an $n.8$-pole three-phase winding those coils which are spaced apart an angle of $\frac{120°}{n}$ instead of 120° are connected together in the above described manner forming groups, and the groups, which are thus spaced $\frac{60°}{n}$ with respect to each other, are connected to the same phase.

This method has the advantage that an $n.8$-pole three-phase winding, which can be changed according to my invention into an $n.6$-pole winding, may be changed by the methods disclosed in my application Serial No. 523,526 filed December 19, 1921 into a 12-pole two-phase winding. To this end the rings 1 and 5 are connected to the terminal I of the phase-converter and the rings 3 and 7 to the terminal VI of this same phase, while the rings 2, 6 and 4, 8 respectively are connected to the two terminals III and IX of the phase spaced 90° apart. Thus the same winding allows two different pole-numbers to be obtained.

Claims:

1. The combination with an induction motor having a three-phase winding with $n \times 8$ poles, where $n$ is an integer, with one coil in each phase for each pole, and each coil overlapping two coils of each of the other phases; of a source of three-phase current and a source of so-called eight-phase current; means including switch mechanism for connecting one end of all of said coils in $n \times 3$ groups to the respective terminals of said three-phase current source, the coils in each group being of the same phase, or for connecting the other ends of all of said coils in $n \times 8$ groups spaced $60/n$ degrees apart to each of the two terminals of each phase of said eight-phase current source, each of said last mentioned groups consisting of $n \times 3$ coils of different phases spaced apart $120/n$ degrees.

2. An induction motor provided with a three-phase winding having $n \times 8$ poles, where $n$ is an integer, with one coil in each phase for each pole and each coil overlapping two coils of each of the other two phases; a terminal member connected to one end of all the coils of one phase, a second terminal member similarly connected to all the coils of another phase, and a third terminal member similarly connected to all the coils of the remaining phase; eight other terminal members, and a connection between the last named terminal members respectively and the other ends of the coils belonging to different phases and spaced apart $120/n$ degrees.

3. A polyphase induction motor having a three-range winding with each coil overlapping two coils of the other two ranges, one end of all the coils being united into $n \times 3$ groups, where $n$ is an integer, and the other ends of the coils belonging to different groups being united into $n \times 8$ groups, and means for connecting said groups either by their $n \times 3$ ends to a polyphase alternating source with an odd number of phases or by their $n \times 8$ ends to a polyphase current source with an even number of phases.

4. A polyphase induction motor having a three-range winding comprising $n \times 24$ coils, $n$ being an integer, each coil overlapping two coils of the other two ranges, the coils being arranged in eight groups, each group containing three coils spaced apart $120/n$ degrees, the coils of the respective groups being united at one end and connected to separate current leads, current leads the number of which is a multiple of three connected to the other ends of the coils, said last mentioned current leads each being connected to the same number of coils belonging to the same range of the winding.

5. A polyphase induction machine having a multiple-pole-number primary winding adapted to operate on different pole numbers and different phase numbers including three phases and eight phases, said winding having the following elements or duplicates thereof, to wit: a three-phase winding with eight poles, with one coil in each phase for each pole, and each coil overlapping two coils of each of the other phases, one end of all of said coils being connected in three groups to the respective three phase-terminals, the other ends of all of said coils being connected in eight groups to the respective eight-phase terminals, each of said last mentioned groups consisting of three symmetrically spaced coils, one from each of the three phases.

In testimony whereof I affix my signature.

KALMAN von KANDO.